(12) United States Patent
Meikrantz

(10) Patent No.: US 7,150,836 B2
(45) Date of Patent: Dec. 19, 2006

(54) MICROWAVE-EMITTING ROTOR, SEPARATOR APPARATUS INCLUDING SAME, METHODS OF OPERATION AND DESIGN THEREOF

(75) Inventor: David H. Meikrantz, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 262 days.

(21) Appl. No.: 10/892,883

(22) Filed: Jul. 16, 2004

(65) Prior Publication Data

US 2006/0011563 A1    Jan. 19, 2006

(51) Int. Cl.
*B04B 1/04* (2006.01)
*H05B 6/78* (2006.01)

(52) U.S. Cl. ............... 210/748; 210/787; 210/806; 210/94; 210/243; 210/294; 210/360.1; 210/380.1; 494/22; 494/37; 494/43; 494/74; 204/155; 204/157.15; 204/554; 204/660

(58) Field of Classification Search .................. 494/22, 494/37, 63, 43, 74; 210/748, 787, 806, 94, 210/297, 360.1, 243, 294, 380.1; 204/155, 204/157.15, 554, 560
See application file for complete search history.

(56) References Cited

U.S. PATENT DOCUMENTS

| | | | |
|---|---|---|---|
| 4,013,558 A | 3/1977 | Rosenberg | |
| 4,067,683 A | 1/1978 | Klaila | |
| 4,412,865 A * | 11/1983 | Schmidt | ............ 494/13 |
| 4,582,629 A | 4/1986 | Wolf | |
| 4,810,375 A | 3/1989 | Hudgins et al. | |
| 4,853,119 A | 8/1989 | Wolf et al. | |
| 4,853,507 A | 8/1989 | Samardzija | |

(Continued)

OTHER PUBLICATIONS

Chan, C., Chen, Y., "Demulsification of W/O Emulsions by Microwave Radiation," Separ. Sci. Tech., vol. 37, No. 15, pp. 3407-3420, 2002.

(Continued)

*Primary Examiner*—David A. Reifsnyder
(74) *Attorney, Agent, or Firm*—TraskBritt, P.C.

(57) ABSTRACT

An apparatus for use in separating, at least in part, a mixture, including at least one chamber and at least one microwave generation device configured for communicating microwave energy into the at least one chamber is disclosed. The rotor assembly may comprise an electric generator for generating electricity for operating the microwave generation device. At least one microwave generation device may be positioned within a tubular interior shaft extending within the rotor assembly. At least a portion of the tubular interior shaft may be substantially transparent to microwave energy. Microwave energy may be emitted in an outward radial direction or toward an anticipated boundary surface defined between a mixture and a separated constituent thereof. A method including flowing a mixture through at least one chamber and communicating microwave energy into the at least one chamber while rotating same is disclosed. Methods of operating a centrifugal separator and design thereof are disclosed.

45 Claims, 13 Drawing Sheets

U.S. PATENT DOCUMENTS

| | | |
|---|---|---|
| 4,959,158 A | 9/1990 | Meikrantz |
| 5,055,180 A | 10/1991 | Klaila |
| 5,211,808 A | 5/1993 | Vilardi et al. |
| 5,222,543 A | 6/1993 | Carlstrom et al. |
| 5,254,075 A | 10/1993 | Nemoto et al. |
| 5,254,076 A | 10/1993 | Chow et al. |
| 5,344,493 A | 9/1994 | Jackson |
| 5,368,171 A | 11/1994 | Jackson |
| 5,571,070 A | 11/1996 | Meikrantz et al. |
| 5,591,340 A | 1/1997 | Meikrantz et al. |
| 5,762,800 A | 6/1998 | Meikrantz et al. |
| 5,908,376 A | 6/1999 | Macaluso et al. |
| 5,911,885 A | 6/1999 | Owens |
| 5,914,014 A | 6/1999 | Kartchner |
| 6,077,400 A | 6/2000 | Kartchner |
| 6,086,830 A | 7/2000 | Kartchner |
| 6,363,611 B1 | 4/2002 | Sheldon et al. |
| 6,723,999 B1 * | 4/2004 | Holl .......................... 210/748 |

OTHER PUBLICATIONS

Fang, C.S., P.Lai, B. Chang, W.J. Klaila, "Oil Recovery and Waste Reduction by Microwave Radiation," Environmental Progress, vol. 8, No. 4, pp. 235-238, Nov.,1989.

Purta, D.A., "Application of Microwaves to the Separation of Oil-Water Sludges," EPRI CMP Report No. 92-6, Jul., 1992.

STAFF, "Radiowave-Based Process Recovers Oil from Sludge at Texas Site," Oil and Gas Journal, Dec. 2, 1996.

Xia, Lixin, Shiwei Lu, and Guoying Cao, "Demulsification of Emulsions Exploited by Enhanced Oil Recovery System," Sep. Sci. Technol., 38, No. 16, 4079-4094, 2003.

* cited by examiner

MICROWAVE-EMITTING ROTOR, SEPARATOR APPARATUS INCLUDING SAME, METHODS OF OPERATION AND DESIGN THEREOF

GOVERNMENT RIGHTS

The United States Government has rights in the following invention pursuant to Contract No. DE-AC07-99ID13727 between the U.S. Department of Energy and Bechtel BWXT Idaho, LLC.

BACKGROUND OF THE INVENTION

1. Field of the Invention

This invention relates generally to centrifugal separation apparatus and methods concerning separating a mixture comprising at least two different constituents. More particularly, the present invention relates to centrifugal separation apparatuses and methods employing centrifugal force in combination with microwave energy for separating a mixture comprising at least two constituents. For instance, the present invention relates to centrifugal separation apparatus and methods pertaining to separation of mixtures such as a colloidal suspension or dispersion. Optionally, or additionally, a mixture may include at least one solid phase dispersed within at least one liquid phase.

2. State of the Art

Centrifugal separators are widely used for separating mixtures including constituents having different densities. Such devices have been found to provide a highly satisfactory method of separating mixtures comprising at least two or more insoluble liquids from one another. One particular colloidal suspension of interest is an emulsion, which is a mixture of two immiscible liquids (e.g., oil and water) in which one is colloidally suspended in the other.

Centrifugal separators, also referred to as extractors or contactors, may separate the individual constituents of a mixed input stream, provided that the constituents remain in separate phases and exhibit different densities. Typically, the liquid mixture may comprise a less dense phase (e.g., oil-based) and a heavier phase (e.g., water-based), which may be introduced into the centrifugal separator through an inlet that communicates with the interior of the centrifugal separator. The liquid mixture then enters the rotor of the centrifugal separator where centrifugal force separates the heavier phase from the lighter phase by forcing the heavier phase to flow outwardly away from the rotational axis of the rotor while displacing the lighter phase toward the rotational axis of the rotor.

The two phases are then individually collected at the upper end of the rotor with the heavier phase exiting at a location adjacent to the outer periphery of the rotor and the lighter phase exiting at a location adjacent to the rotational axis of the rotor. Typically, one or both of the exiting phases may be subjected to one or more subsequent stages of extraction, such as by circulation through another centrifugal separator.

One example of a method for centrifugally separating the components of a mixture is described in U.S. Pat. No. 4,959,158 to Meikrantz, the disclosure of which is incorporated, in its entirety, by reference herein. Also, U.S. Pat. No. 5,591,340 to Meikrantz et al., the disclosure of which is incorporated, in its entirety, by reference herein, discloses a centrifugal separator having a housing with a generally cylindrical inner surface defining an inner chamber. A hollow rotor is disposed within the chamber for rotation therein. At least one inlet is provided for introducing a liquid mixture into the annular volume between the rotor and the housing, where it is then directed into the rotor. An upper rotor assembly separates the liquid mixture by phase densities with the disparate constituents directed to respective outlets. In one embodiment of the invention, the upper rotor assembly includes a removable weir ring to facilitate "tuning" of the separation process. The rotor of the centrifugal separator is mounted on a unitary rotor shaft that extends axially through the separation chamber between upper and lower bearing assemblies in the separator housing. The bottom surface of the housing, where the liquid mixture is directed from the annular mixing volume into the rotor, preferably includes a plurality of radial vanes that are curved in the direction of rotation of the rotor to assist in directing the liquid mixture with minimal turbulence. Collector rings for the separated constituents provided from the upper rotor assembly are preferably formed integrally in the wall of the housing with a smoothly contoured peripheral surface to reduce turbulence of the output streams.

Enhanced separation of oil-water emulsions and dispersions using microwave radiation is disclosed in U.S. Pat. No. 4,582,629 to Wolf. In this disclosure, Wolf demonstrated through several benchtop experiments that microwave power applied to oil-water emulsions could increase oil-water separation rates by more than a factor of two compared to simple heating alone. Results suggested that microwaves were enhancing the separation rate through a mechanism distinct from heating alone. Additional disclosures relating to applying microwaves to oil-water emulsions include U.S. Pat. No. 4,853,507 to Samardzija; U.S. Pat. No. 5,055,180 to Klaila; U.S. Pat. No. 4,810,375 to Hudgins, et al.; and U.S. Pat. No. 4,853,119 to Wolf, et al. All of these patents relate to the advantages of enhanced emulsion breaking properties through the application of microwave radiation.

While generally applicable to any type of emulsion or suspension, one prevalent application of microwave-enhanced emulsion breaking technologies, for example, may be related to the petroleum industry. Another application for microwave-enhanced separation may include various applications related to food processing.

Regarding petroleum applications, crude oil pumped from wells may be typically co-mingled with suspended solids and water. Since the water and solids may be undesirable if contained in refinery feedstocks, it is preferable to remove these components. The separation of oil from water and solids using gravitational settling methods is typically incomplete and, therefore, unsatisfactory. The mixture which remains in such a process is a waste product and may consist of stable oil/water emulsions mixed with at least one solid phase.

It has been estimated that more than 2% of the crude oil currently pumped from the ground takes the form of these stable oil-water emulsions mixed with solids. Having little or no value to oil producers, the waste may typically be held in open pits and ponds or stored in large crude oil storage tanks. Such waste presents an ever-worsening remediation problem to oil producers and refiners.

Conventional methods to separate oil/water emulsions include application of heat, microbial breakdown, centrifugation, and chemical addition. However, most of these methods may not generate marketable product. Rather, only partial separation may be achieved and large amounts of waste that must be carefully disposed of may result. Also, conventional heating methods may exhibit problems with slow heat transfer into thick oil and water emulsions, accumulation of heavy layers of solid residue on heat transfer surfaces, and loss of valuable volatiles. Chemical demulsifiers, such as alum and polyamines, are available to break oil-water emulsions, but may be expensive or may pose difficulties in disposal. In addition, chemical treatment can be a relatively slow process that may not provide high levels of separation of particular emulsions.

Accordingly, microwaves may be relatively effective in facilitating crude-oil emulsion separation by heating the emulsion, since microwaves may penetrate deeply into the interior of thick or viscous emulsions, providing a very effective heating alternative. As the sludge is heated, viscosity is lowered, and rapid coalescence of liquid phases may occur. Generally, conventional apparatus and methods utilizing microwaves to enhance separation of a mixture may expose the mixture to microwave energy prior to introducing the mixture within a centrifugal separator.

One method and apparatus relating to exposing a material to microwave energy within a centrifuge are disclosed in U.S. Pat. No. 5,211,808 to Vilardi, et al., which relates to an apparatus for removal of water or other liquids and concentration of a substance. More particularly, Vilardi discloses a vacuum centrifugal concentrator for heating the substance being processed to enhance the concentration procedure.

U.S. Pat. No. 5,222,543 to Carlstrom, et al. discloses an apparatus for centrifugal casting of hollow articles. The apparatus has an elongate generally cylindrical hollow mold with a center conductor extending along the longitudinal axis so that the combination acts as a coaxial waveguide. Thus, a method for centrifugal casting, in which a casting composition is placed in a hollow rotating mold and microwave radiation is directed into the mold for heating thereof, is disclosed.

Microwaves within a centrifuge have also been used for cleaning. U.S. Pat. Nos. 5,344,493 and 5,368,171 to Jackson disclose the use of one or more dense fluids which are mixed with one or more chemical or physical agents and are simultaneously subjected to microwave radiation and centrifugal force to remove deeply recessed contaminants from internal and external surfaces of intricately arranged or formulated substrates. Subsequently, cleaned substrates are simultaneously subjected to microwave radiation and centrifugal force under vacuum to remove residual volatile contaminants. Additionally, the cleaned and sterilized substrates are contacted with chemical or physical agents to provide enhanced cleaning and to provide new and improved substrate properties. Finally, substrates which are prepackaged in semi-permeable membranes are cleaned using this apparatus, thus preventing recontamination of the cleaned substrates.

While the above-described conventional apparatus and methods relating to mixture separation may be useful for their intended purposes, it may be readily appreciated that it would be advantageous to provide improved methods and apparatus for centrifugal separation of a mixture comprising at least two constituents. For instance, a mixture may comprise a colloidal suspension or dispersion. Optionally or additionally, a mixture may comprise at least one solid phase.

BRIEF SUMMARY OF THE INVENTION

The present invention relates to an apparatus for separating, at least in part, a mixture. Particularly, a rotor assembly of the present invention may include a rotor wall, a tubular interior shaft extending longitudinally within the rotor wall, and at least one chamber defined, at least in part, by the rotor wall. Further, the apparatus may include at least one microwave generation device configured for communicating microwave energy into the at least one chamber of the rotor assembly. The at least one microwave generation device may comprise at least one of a maser, a klystron, and a magnetron tube.

In one embodiment, a rotor assembly of the present invention may be configured as an electric generator and configured for generating sufficient electricity for operation of the at least one microwave generation device.

The at least one microwave generation device may be configured for communicating microwave energy into the at least one chamber from within the tubular interior shaft generally radially outwardly toward the rotor wall. At least a portion of the tubular interior shaft may be substantially transparent to microwave energy. Emitting microwave energy along a generally outward radial direction within the at least one chamber of the rotor assembly may be advantageous for promoting its interaction of the microwave energy with an interfacial surface between a mixture and a separated liquid constituent thereof.

Additionally, the present invention relates to a centrifugal separator including a rotor assembly according to the present invention.

The present invention further relates to apparatuses and methods for at least partially separating a mixture. For instance, the present invention may be applied for at least partially separating an emulsion or dispersion. Optionally or additionally, at least one solid phase may be separated by the apparatuses and methods of the present invention.

More specifically, a rotor assembly of the present invention may be provided. A mixture including at least two constituents may be introduced within at least one chamber of a rotor assembly and the rotor assembly may be rotated. Further, microwave energy may be communicated into the at least one chamber of the rotor assembly while rotating the rotor assembly.

Yet another aspect of the present invention relates to a method of operating a centrifugal separator. For instance, a centrifugal separator including a rotor assembly may be provided, wherein the rotor assembly includes a rotor wall, a tubular interior shaft extending longitudinally within the rotor wall, and at least one chamber defined, at least in part, by the rotor wall. Further, a mixture comprising at least two constituents may be flowed through the rotor assembly while rotating the rotor assembly and while directing microwave energy into the at least one chamber. In one embodiment, microwave energy may be directed generally from a radially inward position therein generally toward a radially outward position therein. In another embodiment, microwave energy may be directed generally toward an anticipated boundary surface defined between the mixture and the separated at least a portion of one of the constituents.

A further aspect of the present invention relates to a method of designing a centrifugal separator. Particularly, a housing may be selected and a rotor assembly for assembly with and rotation within the housing may be selected. Also, an anticipated mixture including at least two separable constituents for flowing through the rotor assembly may be selected. At least one microwave generation device for communicating microwave energy into the at least one chamber may be positioned and configured. In one embodiment, the at least one microwave generation device may be positioned and configured for communicating microwave energy into the at least one chamber generally from a radially inward position within the rotor assembly generally toward a radially outward position therein. In another embodiment, the at least one microwave generation device may be positioned and configured for communicating microwave energy generally toward an anticipated boundary surface defined between the mixture and the separated at least a portion of one of the constituents.

Additionally, further methods of operation of a centrifugal separator are encompassed by the present invention. For instance, a centrifugal separator including a rotor assembly, wherein the rotor assembly includes at least one chamber configured for flowing a mixture therethrough may be provided. Also, a mixture comprising at least two constituents may be flowed through the at least one chamber of the rotor assembly while rotating the rotor assembly. In addition, microwave energy may be directed into at least one chamber of the rotor assembly from a generally central radial position thereof to a position radially outward therefrom. Alternatively, microwave energy may be directed into at least one chamber of the rotor assembly generally toward an anticipated boundary surface defined between the mixture and the separated at least a portion of one of the constituents.

In a further alternative, microwave energy may be directed into at least one chamber of the rotor assembly and at least a portion of at least one constituent of the at least two constituents may be separated from the mixture. Moreover, interaction of the microwave energy with the separated at least a portion of the at least one constituent may be limited.

BRIEF DESCRIPTION OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DETAILED DESCRIPTION OF THE INVENTION

Figure 1:
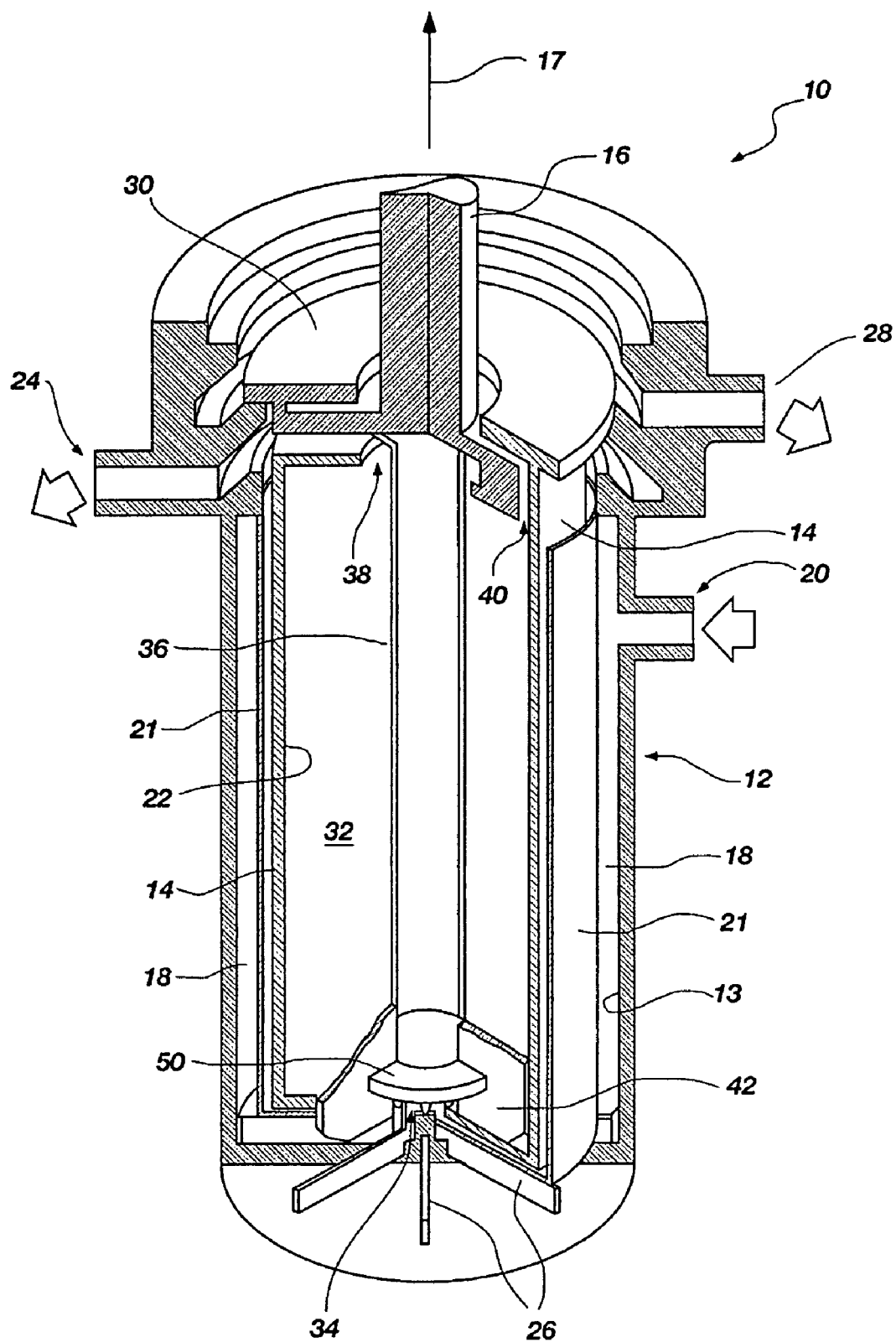
FIG. 1 shows a schematic partial cross-sectional view of a centrifugal separator of the present invention.

FIG. 1 shows a schematic side cross-sectional view of a centrifugal separator 10 according to the present invention. The centrifugal separator 10 comprises a housing 12 which may be vertically oriented and may define a generally cylindrical volume which houses a vertically-oriented, substantially cylindrical rotor assembly 14 defined generally by rotor wall 22. Rotor assembly 14 may also include drive shaft 16, weir structure 30, interior shaft 36, walls 42, diverter disk 50 and lower shaft extension 55, each of which may be separable from one another, as known in the art. Drive shaft 16 may be operably coupled to and selectively rotated by a motor (not shown), as known in the art. Of course, rotor assembly 14 may include an upper bearing (not shown) and a lower bearing (not shown) configured for providing support and ease of rotation about central axis 17 proximate shaft extension 55 and drive shaft 16, respectively.

Housing 12 may include an inlet 20 through which, during operation, a mixture, such as, for instance, a dispersion or emulsion of immiscible liquids, may be introduced. By way of example, an oil and water emulsion may be introduced into housing 12 through inlet 20. Alternatively, a mixture of at least one liquid and at least one solid phase may be introduced into housing 12 through inlet 20. Particularly, food processing applications may include at least one solid phase dispersed within at least one liquid. Of course, screens or other devices may be used in cooperation with the apparatuses of the present invention for processing at least one solid phase within a mixture. Further, food processing applications may be directed toward oil/water emulsions or dispersions, without limitation.

In further detail, a mixture may be introduced through inlet 20 into annular region 18 defined between the outer radial surface of the rotor sleeve 21 and the inner radial surface of the housing 12. Rotor sleeve 21 may be typically configured to be stationary with respect to inner surface 13 of housing 12. Such a configuration may reduce additional mixing of the constituents of a mixture as it flows within annular region 18. Accordingly, flow of a mixture through annular region 18 may proceed generally vertically downwardly from inlet 20 and toward radial vanes 26.

Radial vanes 26 may be affixed to housing 12 and may be configured for directing the mixture toward rotor inlet aperture 34. Radial vanes 26 may extend substantially radially outwardly from the central axis 17 of the rotor assembly 14 toward the inner surface 13 of the housing 12 or, alternatively, may extend along an arcuate path in a generally radially outward fashion from the central axis 17 of the rotor assembly 14 toward the inner surface 13 of the housing 12. Such a configuration may reduce turbulent mixing of the constituents of a mixture passing along radial vanes 26.

Further, a mixture may continue past radial vanes 26 and flow into rotor inlet aperture 34 of rotor assembly 14. Since rotor sleeve 21 may be stationary, while adjacent rotor assembly 14 rotates, an annular seal (not shown) may be provided therebetween, as known in the art. Further, a mixture passing into rotor inlet aperture 34 of rotor assembly 14 may encounter diverter disk 50. Of course, one or more additional sealing elements (not shown), which may comprise dynamic sealing elements or static sealing elements, may be included within centrifugal separator 10 as known in the art. For instance, sealing elements may inhibit the mixture from contact with a motor (not shown), an upper bearing (not shown), or a lower bearing (not shown).

Generally, rotor assembly 14 may define a generally annular volume which is defined between interior shaft 36 and the inner radial wall 22 of rotor assembly 14. Further, the annular volume may include one or more chambers 32, which may be defined, at least in part, by one or more walls 42 in combination with rotor wall 22, as described hereinbelow in greater detail. Such a configuration may provide increased surface area for interaction with a mixture passing through the rotor assembly 14.

Preferably, one or more chambers 32 may comprise at least three chambers for distributing the weight of the mixture and its constituents passing therethrough substantially uniformly during rotation of the rotor assembly 14. In addition, walls 42 may be oriented substantially vertically or as otherwise desired for forming at least a portion of the one or more chambers 32.

Once a mixture is admitted into the interior of the rotor assembly 14, the centrifugal force of rotation thereof, at generally any desired rotation speed, may cause a constituent of the mixture having a higher density to be forced outwardly against the inner radial wall 22 of rotor assembly 14. For instance, but not by way of limitation, the rotor assembly 14 may be configured to rotate at speeds of up to 3000 revolutions per minute, for example, between 1000 and 3000 revolutions per minute. Thus, a constituent of the mixture having a lower density may be displaced radially inwardly toward the interior shaft 36 by a constituent having a higher density, as described in greater detail hereinbelow. As may be appreciated, separation of two liquids having different densities may be effected by operation of the centrifugal separator 10 due to the forces developed by rotation of the rotor assembly 14.

Also as shown in FIG. 1, a constituent having a lesser density and the constituent having a greater density may be individually expelled from the housing 12 through exit ports 24 and 28, respectively. More particularly, the constituent having a lesser density may proceed through weir structure 30 through collection port 38, which may be positioned generally proximate interior shaft 36. Also, the constituent having a greater density may proceed through weir structure 30 through collection port 40, which may be positioned generally proximate the rotor wall 22 of rotor assembly 14.

Of course, housing 12 may include more than one inlet port, without limitation. For instance, a plurality of separate liquid or mixtures may be introduced into housing 12 by way of individual inlet ports (not shown). Additionally, one or more chemical agents (e.g., a surfactant) for facilitating separation of a mixture may be introduced within housing 12 via one or more additional inlet ports (not shown).

It may be recognized that the general arrangement of the components comprising centrifugal separator 10 but not relating to the environment within rotor assembly 14 may be reasonably representative of conventional centrifugal separators as known in the prior art. Therefore, additional details of the construction of the centrifugal separator 10, other than particular subject matter relating to the present invention, will not be described in further detail herein.

Figure 2A:
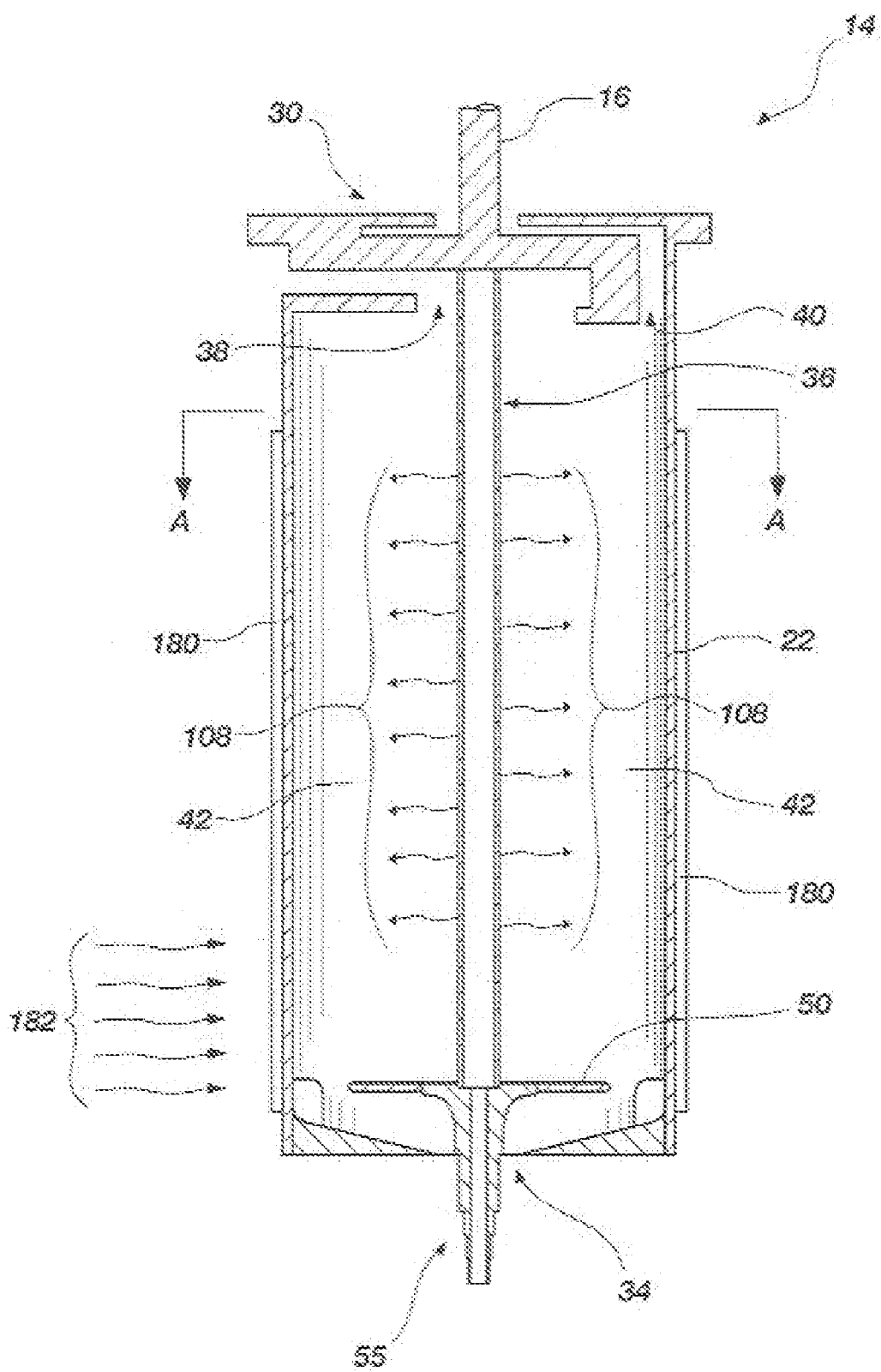
FIG. 2A shows a side cross-sectional view of an exemplary embodiment of a rotor assembly of the present invention.
Figure 2B:
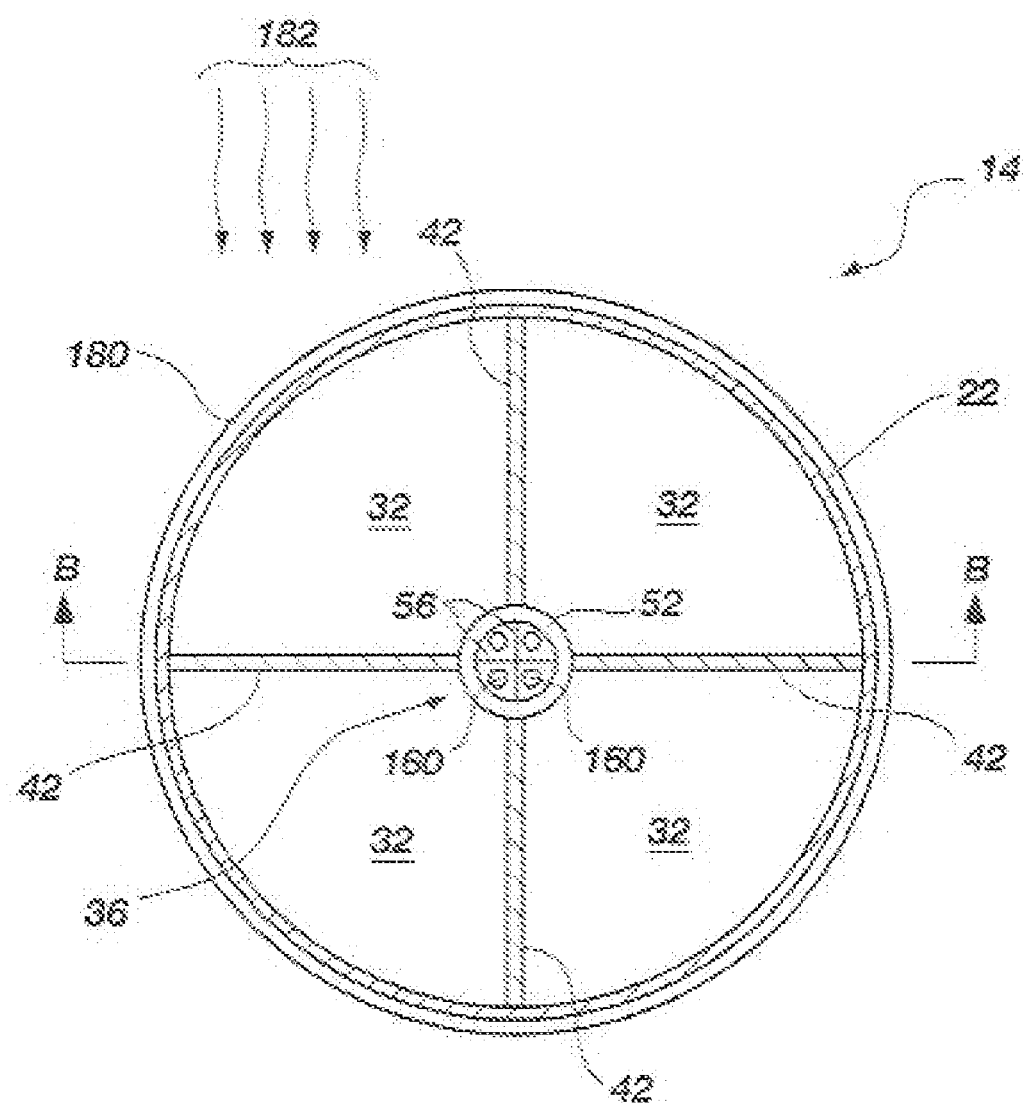
FIG. 2B shows a top elevation cross-sectional view of the rotor assembly shown in FIG. 2A.

Turning to FIGS. 2A and 2B, a rotor assembly 14 of the present invention is shown in a side cross-sectional view and a top elevation cross-sectional view, along reference lines B—B and A—A, respectively.

FIG. 2A shows the components of rotor assembly 14, namely the drive shaft 16, weir structure 30, interior shaft 36, walls 42, diverter disk 50 and lower shaft extension 55. As shown in FIG. 2A, interior shaft 36 is hollow or tubular. As mentioned above, the interior of rotor assembly 14 may be divided into one or more chambers 32. FIG. 2B shows a top elevation cross-sectional view of rotor assembly 14 taken along reference line A—A (FIG. 2A). Walls 42 extend radially from the interior shaft 36 to the outer wall 22 of rotor assembly 14. In the embodiment shown in FIG. 2B, four walls 42 are shown; however, the present invention is not so limited. Rather, there may be one or more walls 42 which define one or more chambers 32 within rotor assembly 14, without limitation.

Additionally, the interior of the rotor assembly 14 may be divided by walls configured in any desired arrangement having any desired geometry. For instance, walls may be arcuate, undulating, spiral, helical, or otherwise configured.

The present invention contemplates that microwave energy (i.e., microwaves) may be communicated within one or more chambers 32 of the rotor assembly 14. Such a configuration may enhance or facilitate disengagement or disruption of the forces which form emulsions or dispersions. Accordingly, such a configuration may promote separation of two immiscible liquids (e.g., oil and water) from one another. Explaining further, the presence of relatively high centrifugal forces in combination with microwave interaction may enhance the separation of a liquid-liquid mixture. That is, separation of dispersions, emulsions, or both may be promoted by exposure thereof to microwave radiation while under the influence of centrifugal force associated with the rotation of the rotor assembly 14.

Thus, in general, a rotor assembly 14 of the present invention may include at least one microwave generation device for generating microwaves to be communicated therein. In further detail, referring to FIG. 2B, microwave energy may be generated by four microwave generation devices 160 positioned generally within the interior shaft 36 and configured for communication of microwave energy into a mixture or its constituents flowing through each of the chambers 32 of the rotor assembly 14. Generally, each of microwave generation devices 160 may comprise any device capable of generating microwaves. For example, each of microwave generation devices 160 may comprise a maser, a klystron, or, as currently preferred, a magnetron tube.

Thus, microwave energy may be generated generally within the interior shaft 36. More particularly, microwave generation devices 160 extend longitudinally within interior shaft 36. Each of microwave generation devices 160 may be configured to communicate microwaves into each of the four chambers 32 of rotor assembly 14, respectively. For example, the bore of the interior shaft 36 may be separated by microwave reflecting walls 56. However, at least a portion of the interior shaft wall 52 of interior shaft 36 may be substantially transparent to microwaves. For instance, the interior wall 52 of interior shaft 36 may comprise at least one of a plastic, a polymer, a water-free ceramic, a quartz, or a glass. Thus, during operation, microwave energy developed by way of microwave generation device 160 may pass through the substantially transparent at least a portion of the interior shaft wall 52 and into each of the four chambers 32 of the rotor assembly 14, respectively.

In further detail, each of microwave generation devices 160 and interior shaft wall 52 may be configured for communicating microwave energy in a substantially radial direction from a central region of the rotor assembly 14 radially outwardly therefrom. Moreover, each of microwave generation devices 160 and interior shaft wall 52 may be positioned, oriented, and configured so as to substantially radially emit microwaves along a selected longitudinal region 108 of the interior shaft 36, as shown in FIG. 2A. More generally, microwave generation device 160 and interior shaft wall 52 may be configured for communicating microwave energy to each of the four chambers 32 of the rotor assembly 14 along substantially the longitudinal length thereof or a portion thereof, without limitation.

Such a configuration may provide interaction time between microwave energy and a mixture passing through each of the four chambers 32 of the rotor assembly 14. Of course, the emission envelope (i.e., the boundary defined by the direction and shape of the emitted microwaves) may be tailored for providing microwave energy within substantially the entire interior of the rotor assembly 14. Alternatively or additionally, the microwave energy emission direction, concentration, amplitude, or frequency may be tailored for enhancing separation of the mixture passing therethrough, as described in greater detail hereinbelow. Also, microwave transmission or amplification components may be used to direct, focus, or otherwise influence the characteristics of microwaves generated by each of microwave generation devices 160, respectively. For example, one or more of a microwave waveguide, coupler, splitter, modulator, mixer, filter, amplifier, converter, attenuator, antenna, or other microwave transmission or communication device may be included within a system or apparatus of the present invention, without limitation.

In a further aspect of the present invention, as illustrated by FIGS. 2A and 2B, a centrifugal separator 10 (FIG. 1) may be configured as an electrical generator for generating electricity for operating the at least one microwave generation device 160, via rotation of the rotor assembly 14. For example, rotor assembly 14 may be configured as an armature including armature windings 180 and a magnetic field 182, for moving the armature windings 180 therethrough, may be provided as a portion of a housing 12 (FIG. 1), rotor sleeve 21 (FIG. 1), or external to the housing 12. Thus, electrical current may be generated in the rotor assembly 14 by rotation thereof within a suitable magnetic field 182. Accordingly, electrical current so produced may be communicated to the microwave generation device 160 for operation thereof. It should be appreciated that there may be various electrical generation configurations, other than the specific embodiment described above, for generation of electrical current via rotation of the rotor assembly 14 which may be employed by the present invention.

Figure 2C:
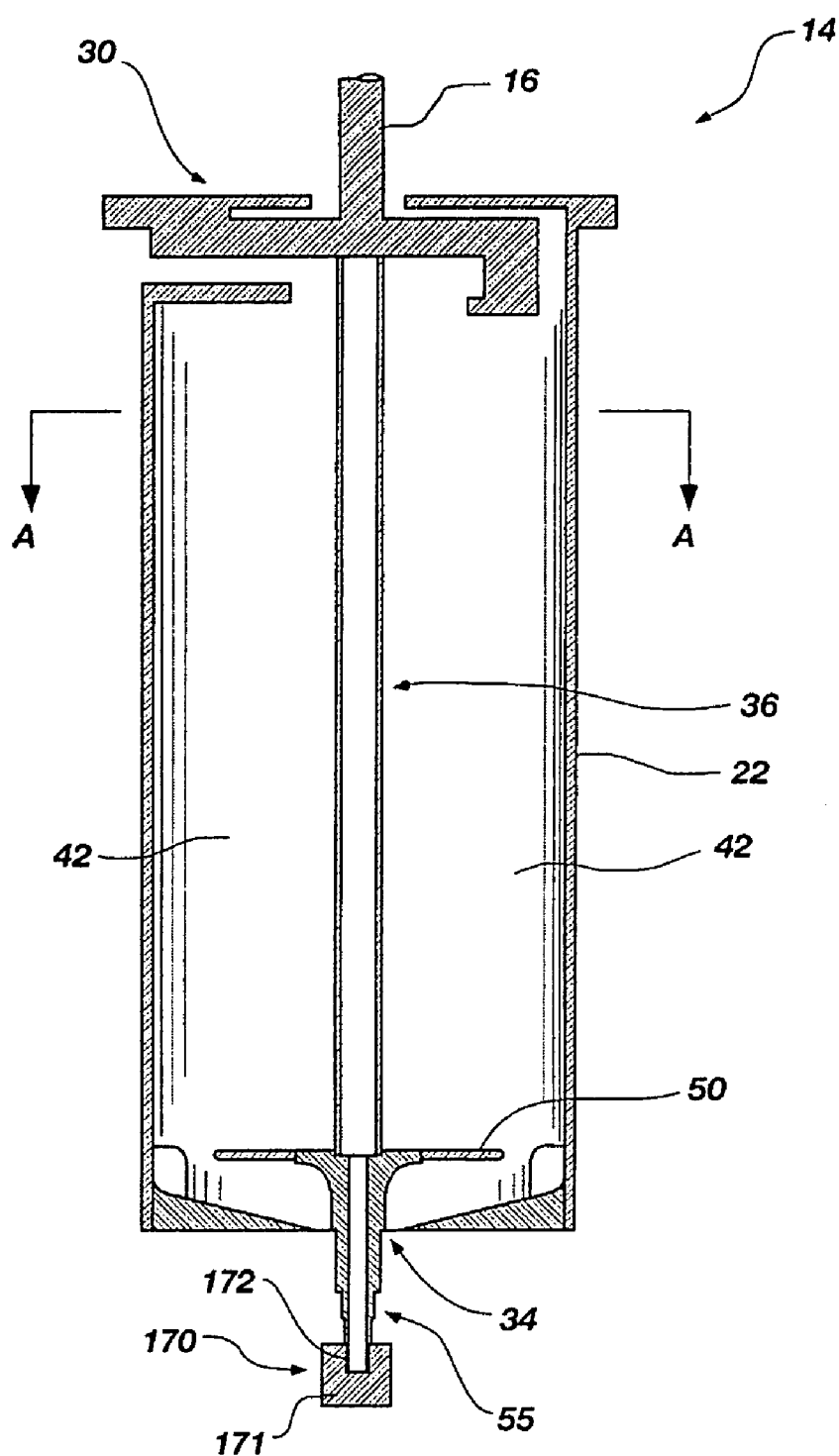
FIG. 2C shows a side cross-sectional view of a rotor assembly according to the present invention.

Alternatively, as illustrated in FIG. 2C, an electrical coupling 170 may be provided for communicating electrical current through the bore of lower shaft extension 55 for operating the at least one microwave generation device 160. In more detail, electrical coupling 170 may be configured for carrying electrical current from the stationary portion 171 thereof to a rotating portion 172 thereof. For example, electrical coupling 170 may comprise a so-called slip-ring type electrical coupling, a so-called contact brush type coupling, or an inductive electrical coupling.

Additionally or optionally, interior shaft 36, as disclosed in U.S. Pat. No. 5,908,376 to Macaluso et al., the disclosure of which is incorporated in its entirety by reference herein, may include a plurality of spray nozzles (not shown) which are sized and configured for cleaning the interior of rotor assembly 14.

Cleaning may be accomplished by temporarily suspending rotation of rotor assembly 14 and allowing the process fluids to drain therefrom through rotor inlet aperture 34. A pressurized supply of cleaning solution may be communicated through the bore of lower shaft extension 55, within conduits such as tubing or, alternatively, if microwave generation devices 160 are sealed, within the core of lower shaft extension 55 itself. Thus, cleaning solution may be communicated through spray nozzles (not shown) disposed along the interior shaft 36. The cleaning solution and materials removed from the interior surfaces drain out through rotor inlet aperture 34 and through a bottom drain (not shown) of the housing 12. Such a configuration may provide an effective system for cleansing the four chambers 32 of rotor assembly 14.

In another aspect of the present invention, the rotor wall 22 and the walls 42 defining chambers 32 may be configured for increasing the interaction time between microwave energy therein and a mixture positioned therein. For instance, the rotor wall 22 and walls 42 may be reflective with respect to microwaves. Accordingly, upon generation and emission of microwave energy from microwave generation device 160, the microwave energy may be retained within each of chambers 32 of rotor 36. Such a configuration may promote interaction between a mixture flowing through rotor 36 and microwave energy communicated therein. Accordingly, such a configuration may promote separation of emulsions or dispersions.

Alternatively, microwave energy may be reflected by rotor wall 22, but at least a portion of one or more of walls 42 may be substantially transparent to microwave energy. In one example, each of the walls 42 may be substantially transparent to microwave energy. Such a configuration may cause microwave energy, once generated by microwave generation device 160 to pass readily through any of the chambers 32 of rotor assembly 14 and may distribute the microwave energy between the chambers 32 of rotor assembly 14 with relative uniformity.

In yet a further alternative, both the rotor wall 22 and the walls 42 may be substantially transparent to microwave energy. In such a configuration, sleeve 21 (FIG. 1) may be configured to reflect microwave energy. Accordingly, during operation, microwave energy may be reflected within the sleeve 21 (FIG. 1), passing through the walls 42 as well as the rotor wall 22.

Figure 2D:
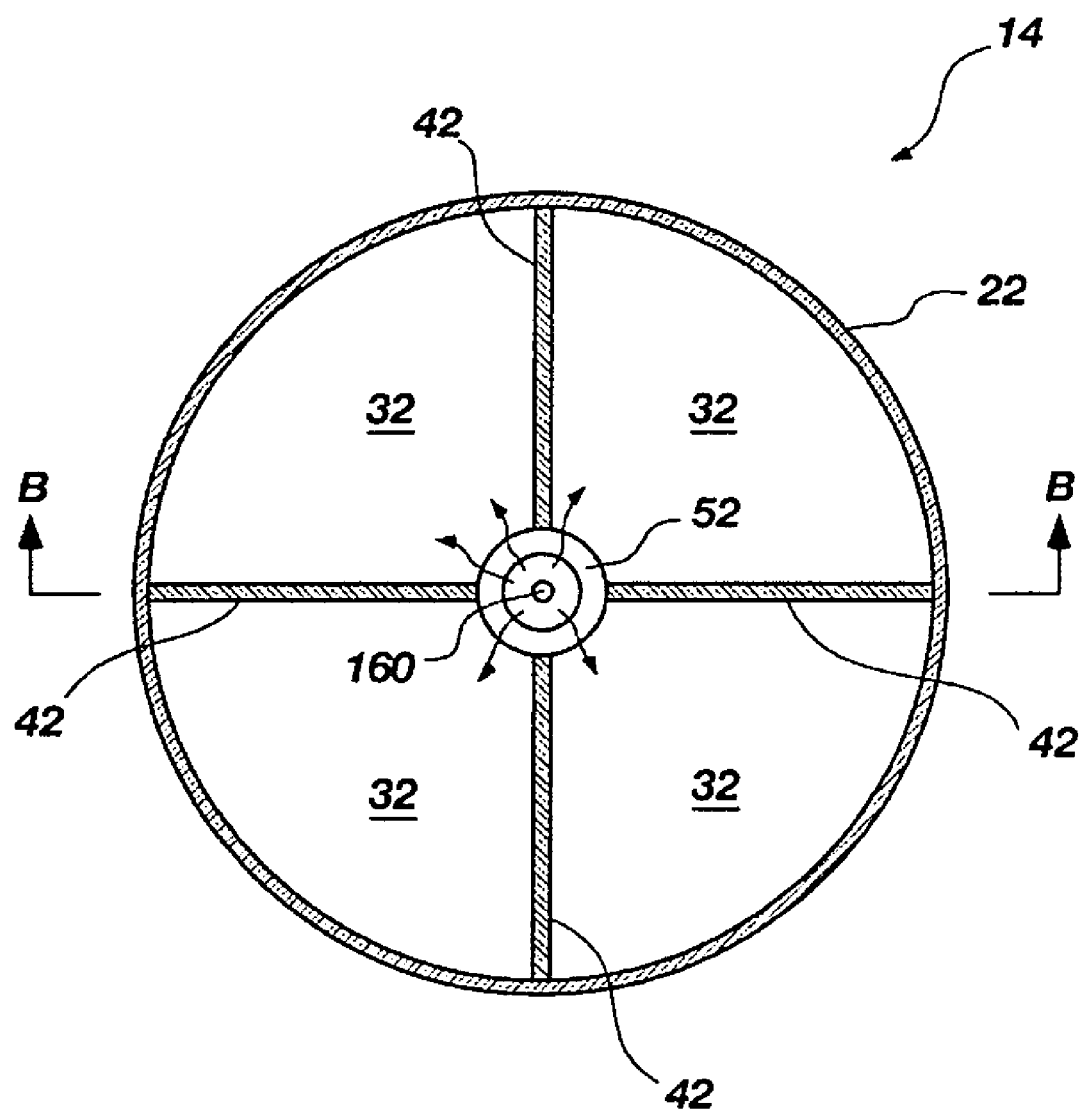
FIG. 2D shows a top elevation cross-sectional view of an alternative, exemplary rotor assembly according to the present invention.

In another embodiment, a rotor assembly 14 may be generally configured as shown in FIG. 2A, but including only a single microwave generation device 160. As shown in FIG. 2D, one microwave generation device 160 may be positioned within interior shaft wall 52 and may be positioned by one or more support members (not shown). Microwave energy may be emitted from microwave generation device 160 and through at least a substantially transparent portion of interior shaft wall 52, the microwave energy moving generally radially outwardly toward rotor wall 22 within each of chambers 32 of rotor assembly 14. Such a configuration may reduce the number of critical parts required to separate a mixture passing through the rotor assembly 14 and may reduce the centrifugal force on the microwave generation device 160, allowing it to be substantially aligned with the central axis 17 (FIG. 1) (i.e., the axis of rotation).

Figure 3A:
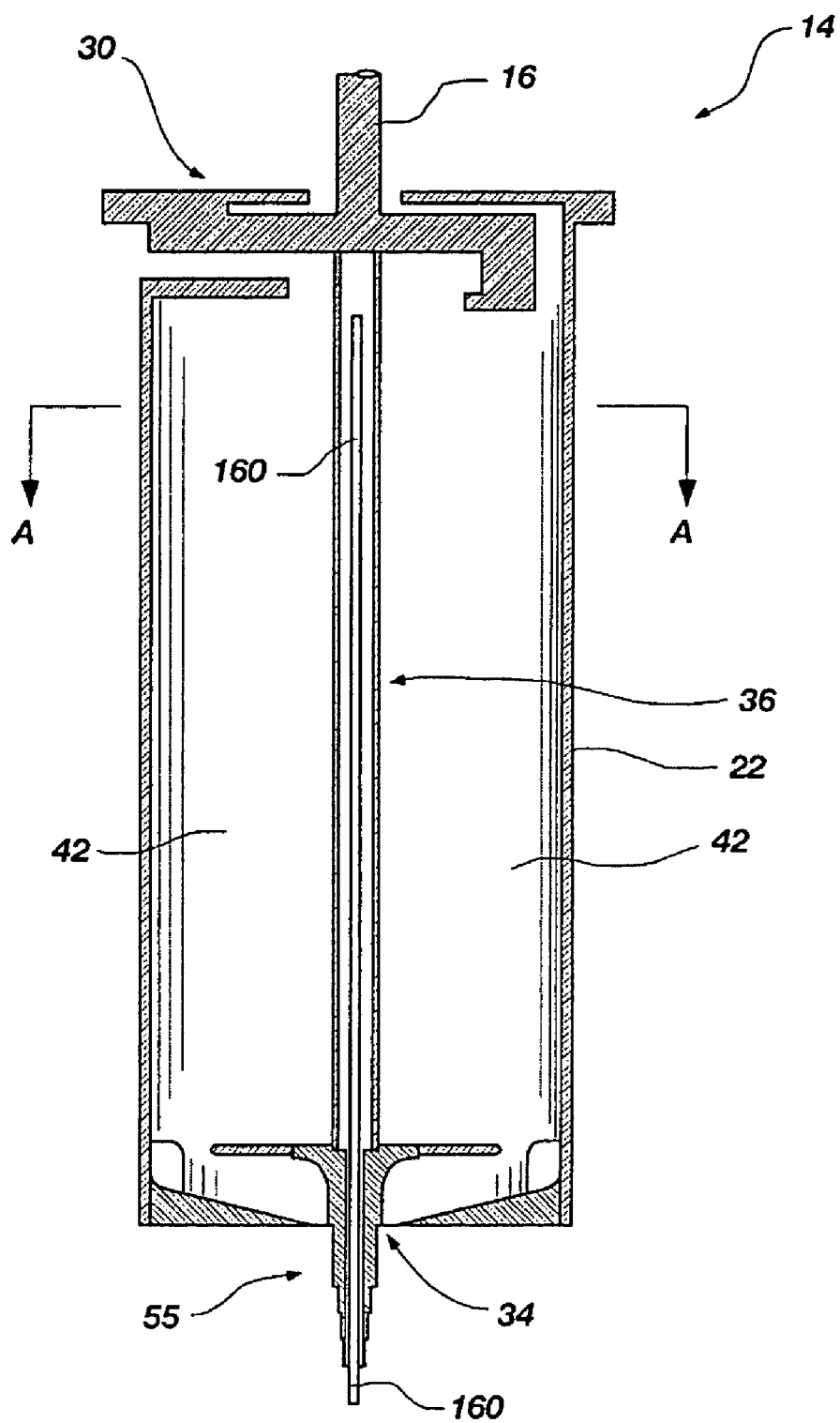
FIG. 3A shows a side cross-sectional view of another exemplary embodiment of a rotor assembly of the present invention.
Figure 3B:
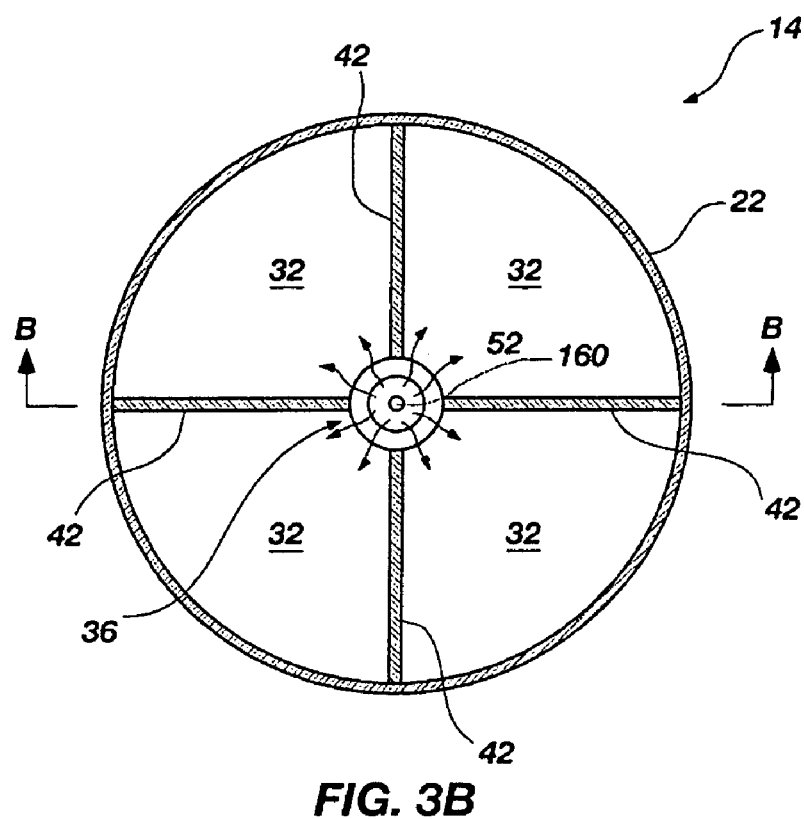
FIG. 3B shows a top elevation cross-sectional view of the rotor assembly shown in FIG. 3A.

In a further embodiment of a rotor assembly for use in a centrifugal separator 10 of the present invention, as shown in FIGS. 3A and 3B, the microwave generation device 160 may be stationary with respect to the rotation of the rotor assembly 14. Thus, the microwave generation device 160 may extend longitudinally within interior shaft 36 and may be positioned within the bore thereof, but may not be affixed thereto. In such a configuration, at least a portion of, or, optionally, the entirety of, the interior shaft wall 52 may be substantially transparent to microwave energy. Thus, during operation, microwave energy may pass into each of chambers 32 as the interior shaft wall 52 rotates about the microwave generation device 160. Such an arrangement may enhance the uniformity with which microwave energy is distributed within each of chambers 32 of rotor assembly 14.

Figure 3C:
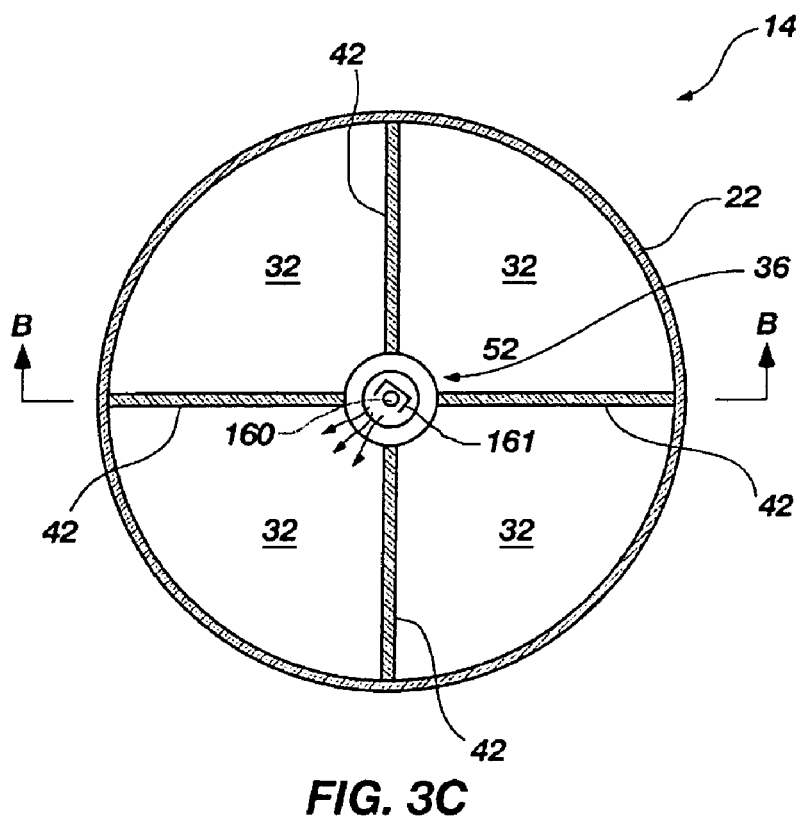
FIG. 3C shows a side cross-sectional view of another exemplary embodiment of the rotor assembly shown in FIG. 3A.

Optionally, as shown in FIG. 3C, which shows a top elevation cross-sectional view of a rotor assembly 14 as shown in FIG. 3A, a microwave reflector 161 may be positioned about microwave generation device 160 and may be sized and configured for directing microwave energy emitted therefrom toward a selected direction (e.g., radially outwardly from a central region of the rotor assembly 14). Such a configuration may provide a relative amount of control over the emission envelope of microwave energy communicated to each of chambers 32 of rotor assembly 14.

Figure 4A:
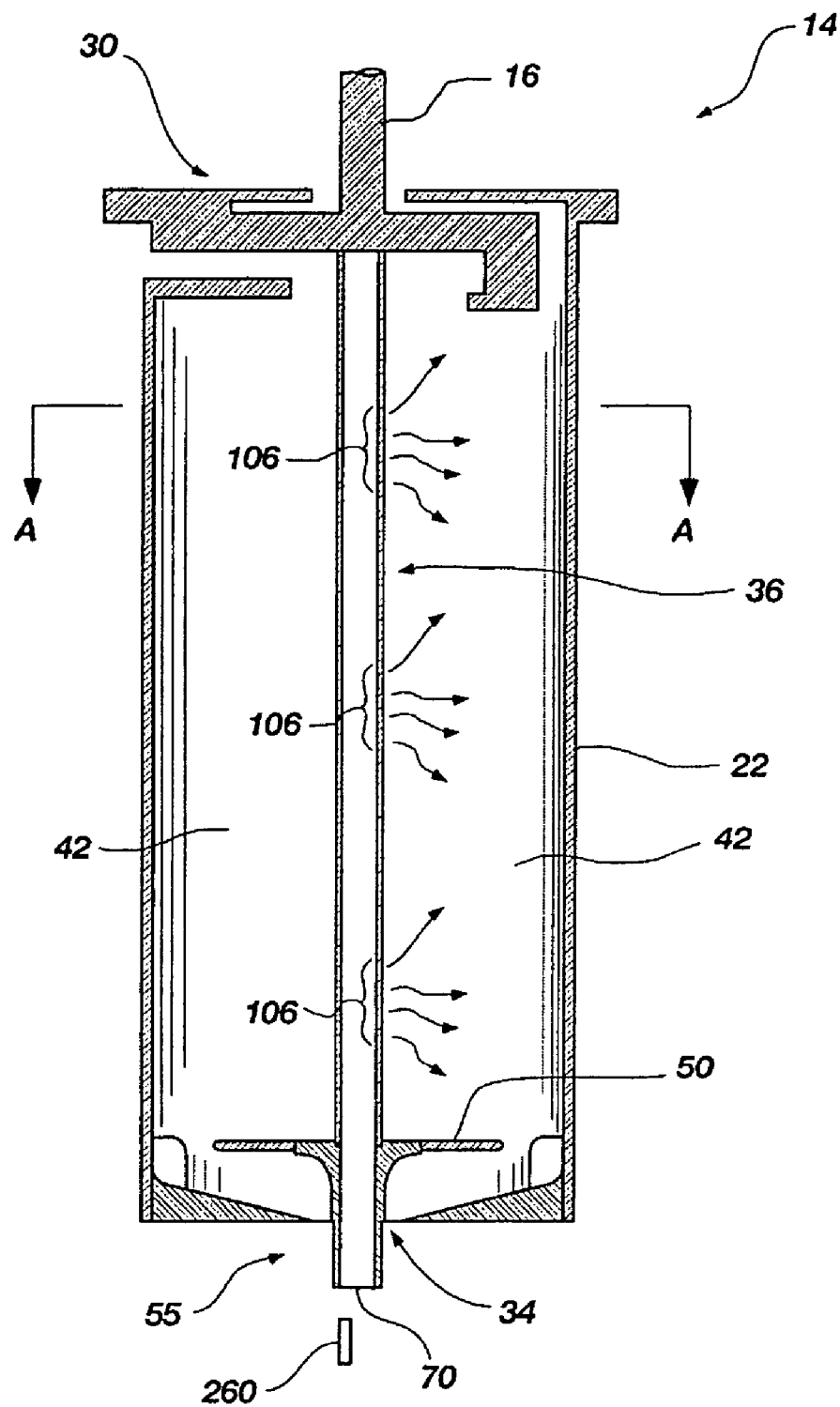
FIG. 4A shows a side cross-sectional view of a further exemplary embodiment of a rotor assembly of the present invention.
Figure 4B:
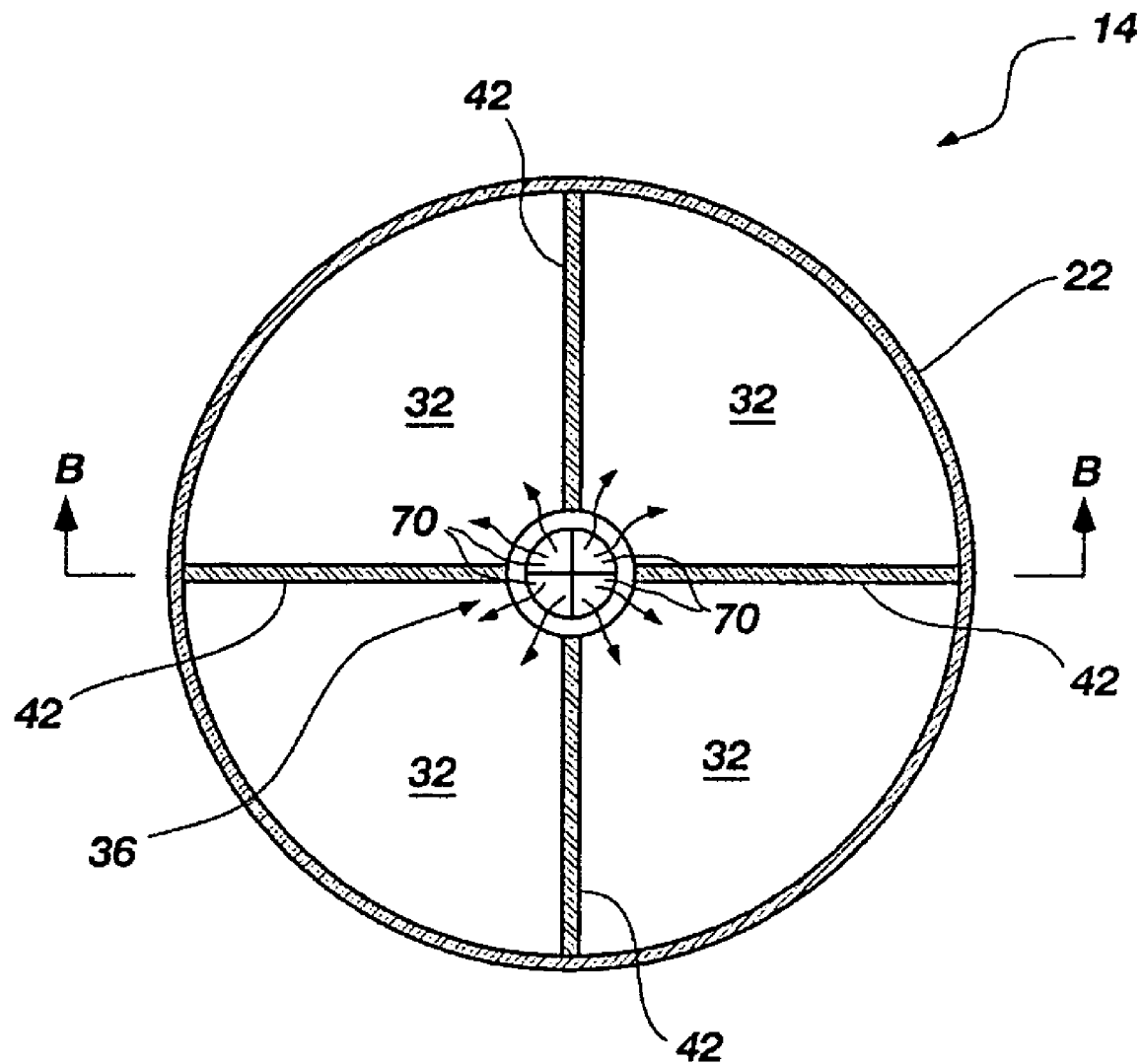
FIG. 4B shows a top elevation cross-sectional view of the rotor assembly shown in FIG. 4A.

Furthermore, one or more waveguides 70 (i.e., a conductor for microwaves) may be used for communicating microwaves into at least one of the chambers 32 of rotor assembly 14. For instance, FIGS. 4A and 4B illustrate a configuration where a microwave generation device 260 may be positioned external to the rotor assembly 14 and may be stationary with respect thereto. As shown in FIG. 4A, microwave generation device 260 may be positioned proximate the lower shaft extension 55 and the interior shaft 36 may include one or more waveguides 70 for communicating microwave energy along the interior shaft and through at least a substantially transparent portion thereof into each of the chambers 32 of the rotor assembly 14. FIG. 4A also illustrates that microwave energy may be emitted from more than one longitudinal region 106 of the interior shaft 36. Such a configuration may provide relative flexibility in communication of microwave energy within each of the chambers 32 of the rotor assembly 14.

Figure 4C:
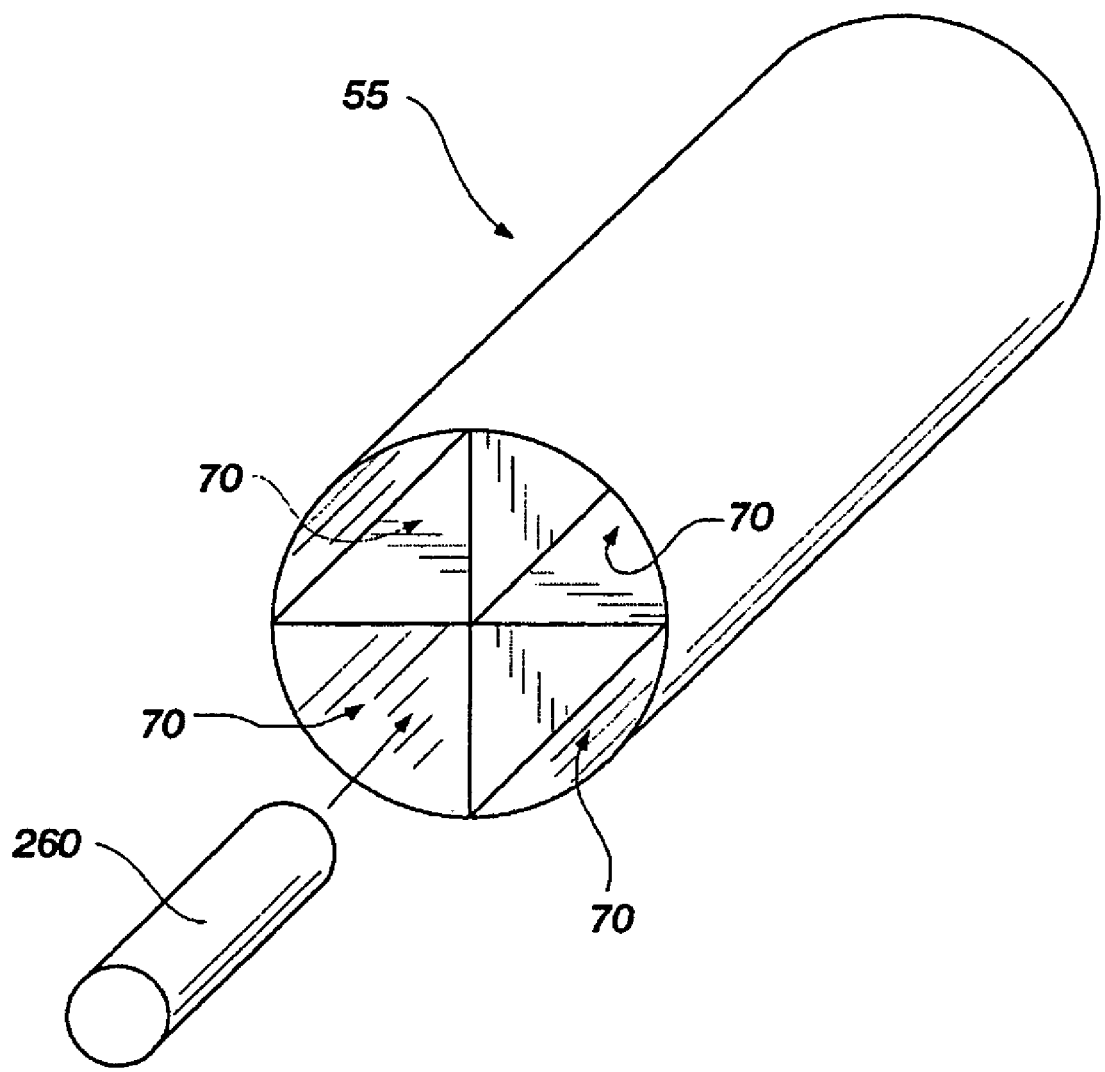
FIG. 4C shows an enlarged perspective view of the lower shaft extension of the rotor assembly shown in FIGS. 4A and 4B.

FIG. 4C shows an enlarged perspective view of the lower shaft extension 55 and microwave generation device 260. As shown in FIG. 4C, the bore of lower shaft extension 55 may be configured as four separate waveguides 70. Further, each of waveguides 70 may be configured for communicating microwave energy to each of chambers 32 of rotor assembly 14. As the lower shaft extension rotates with the rotor assembly 14, each of the waveguides 70 may become sequentially aligned with the emission of microwave energy from microwave generation device 260. Thus, microwave energy may be communicated to each of chambers 32 in a sequential fashion (i.e., one at a time). Alternatively, the microwave generation device 260 may be aligned coaxially with a single waveguide (not shown) disposed within the bore of the lower shaft extension 55, wherein the single waveguide (not shown) is configured to distribute microwave energy from the microwave generation device 260 into each of the chambers 32 substantially uniformly and in a substantially simultaneous fashion.

As mentioned above, it may be advantageous to emit microwave energy along a generally outward radial direction. Explaining further, emitting microwave energy along a generally outward radial direction may be advantageous in facilitating its interaction with an interfacial surface between a mixture which is experiencing forces developed by way of the rotation of the rotor assembly 14 and, for instance, a coalesced liquid constituent thereof. It should be understood that a constituent of a mixture may include at least one solid phase, without limitation.

Figure 5:
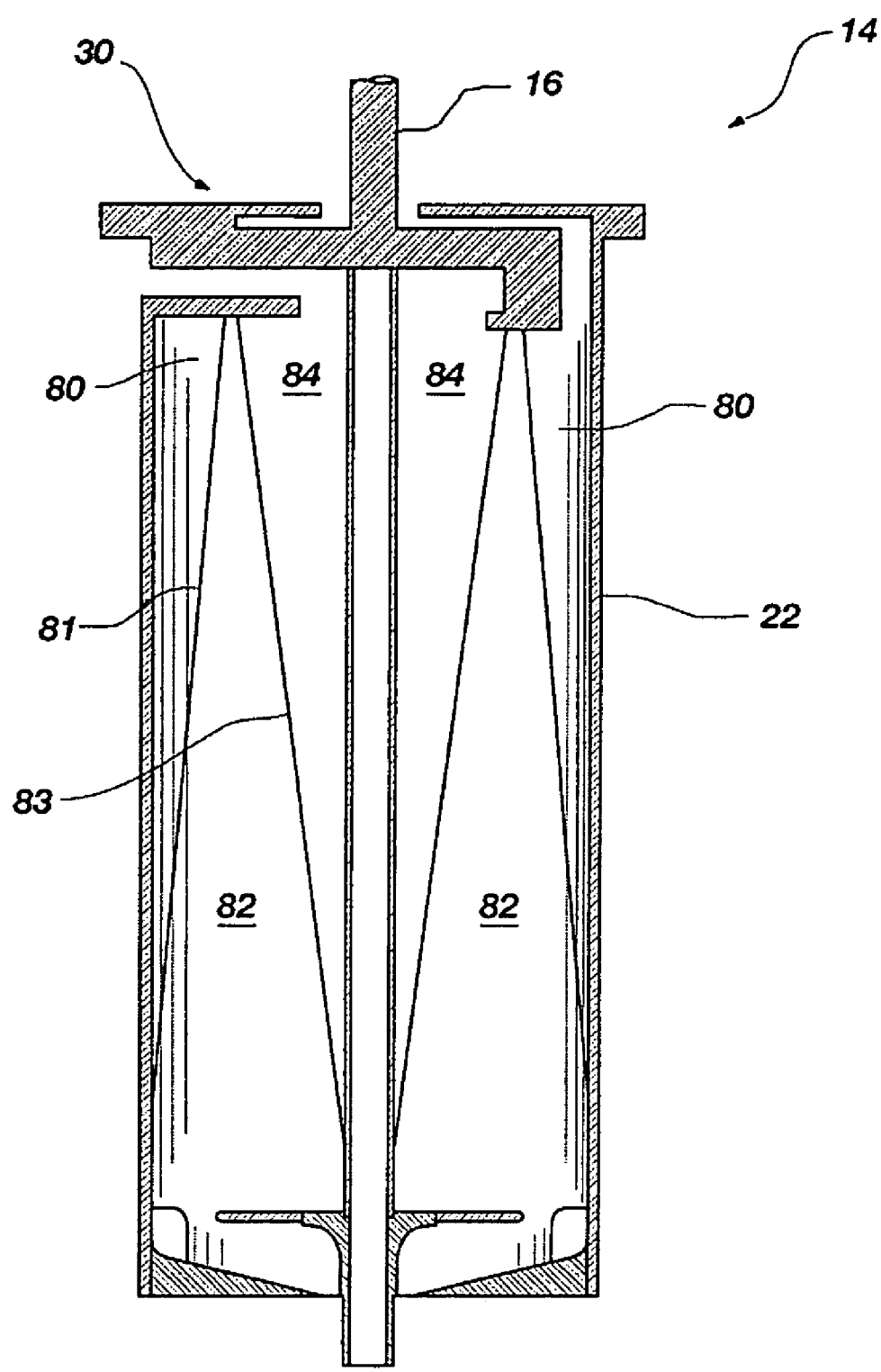
FIG. 5 shows a schematic side cross-sectional view of a rotor assembly of the present invention during operation.

For instance, FIG. 5 shows a schematic representation of a rotor assembly 14 of the present invention during centrifugal separation of a mixture, wherein the mixture comprises a less dense constituent and a more dense constituent. Explaining further, regions 82, 84, and 80, respectively, indicate anticipated regions occupied by a mixture, a separated, less dense constituent of the mixture, and a separated, denser constituent of the mixture, respectively. Region 82 may generally include the mixture and may be adjacent to region 80, which may generally include the separated, relatively denser constituent. As shown in FIG. 5, region 80 and region 82 may be adjacent one another along an anticipated interfacial surface 81. Likewise, region 82 may be adjacent to region 84 including the separated, relatively less dense constituent along an anticipated interfacial surface 83.

It may be recognized that the above-described regions 80, 82, and 84 may form in response to centrifugal forces alone. Accordingly, it is also recognized that the communication of microwave energy within one or more of regions 80, 82, and 84, may alter or affect the shape or size or both the shape and size thereof.

Of course, it should be understood that the present invention contemplates a mixture including at least two constituents, without limitation. Therefore, centrifugal separation of a mixture including more than two constituents may form more than two separated constituent regions adjacent one another along respective interfacial surfaces.

Thus, modeling or experimentation may be used to predict the anticipated interfacial surface 81, anticipated interfacial surface 83, or both in response to centrifugal force, microwave energy, or the combination of centrifugal force and microwave energy. Such prediction may be of benefit in relation to the operation of a centrifugal separator of the present invention and in the design of a centrifugal separator of the present invention. For instance, during operation, concentrating microwave energy generally proximate an anticipated location of a predicted interfacial surface, wherein the predicted interfacial surface is defined between a region including a mixture and a region including at least one substantially separated constituent of the mixture, may be beneficial for promoting at least partial separation of at least one constituent from a mixture.

The above-described formation of anticipated interfacial surfaces 81 and 83 may also be advantageously considered in relation to the delivery of microwave energy within rotor assembly 14. In one aspect, it may be recognized that introducing microwave energy generally from a radially inward position and communicating microwave energy a substantially radial direction outwardly therefrom may be advantageous because region 84 including a less dense constituent is positioned along substantially the longitudinal length of the interior shaft 36 and radially proximate the interior shaft 36. Therefore, microwave energy may travel through region 84 including the less dense constituent and interact with interfacial surface 81 without substantial attenuation or reduction of its amplitude.

More specifically, considering, for example, region 82 including a mixture, region 80 including water, and region 84 including oil, it may be generally desirable to reduce or limit the interaction of microwave energy with separated water, since water may be particularly susceptible to heating therewith and such heating may naturally reduce the amount of microwave energy which is available for promoting disengagement or disruption of the forces which form emulsions or dispersions.

Thus, summarizing, it may be beneficial to communicate microwave energy within rotor assembly 14 in such a way that microwave interaction with interfacial surfaces formed between a mixture and a separated constituent thereof may be promoted. Optionally, or additionally, it may be beneficial to communicate microwave energy within rotor assembly 14 in such a way that microwave interaction with the mixture is promoted. Or, in another context, it may be beneficial to limit or reduce microwave interaction with a separated constituent which may undesirably reduce or attenuate the microwave energy.

Figure 6A:
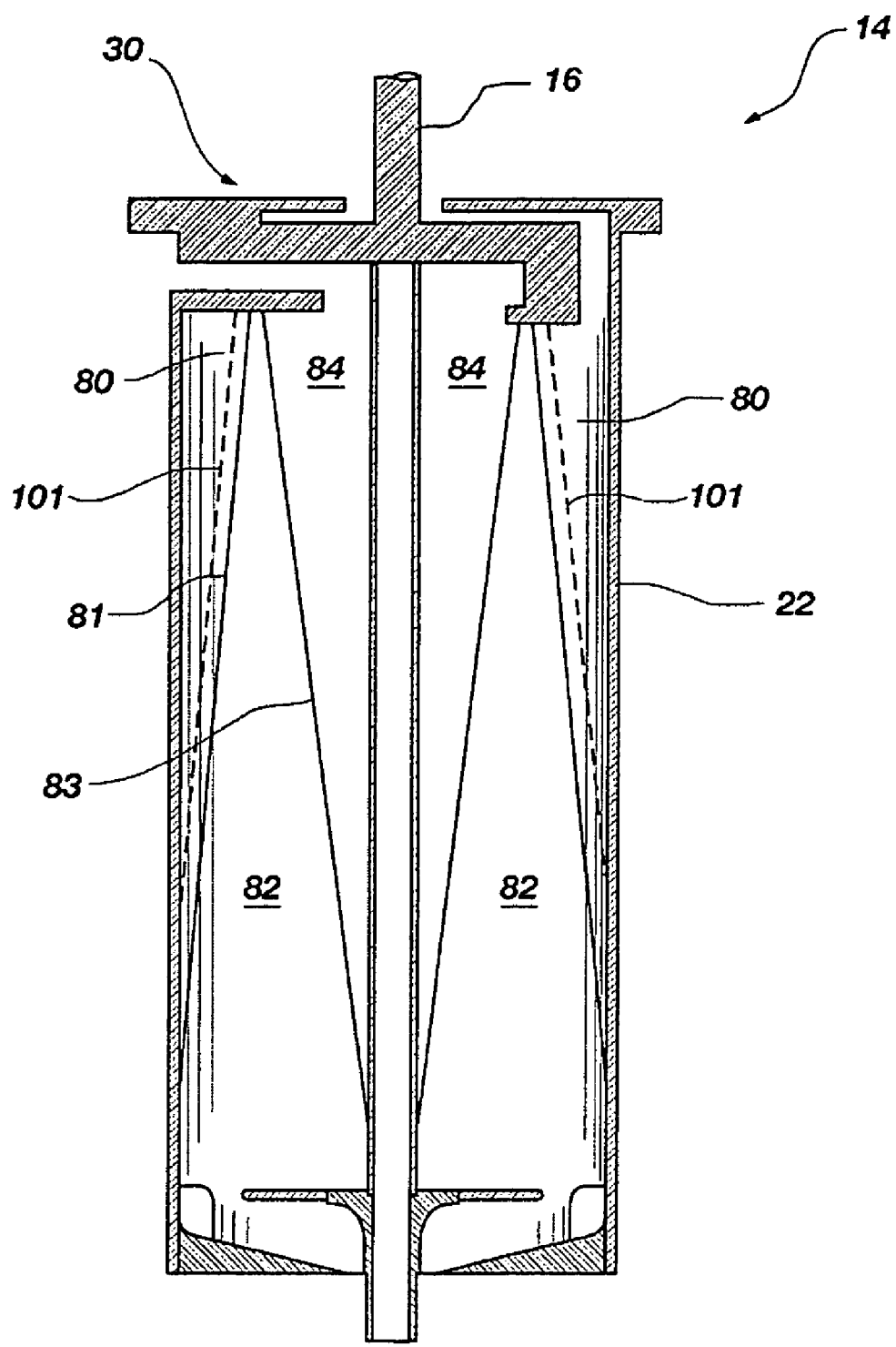
FIG. 6A shows a side cross-sectional view of an exemplary embodiment of a rotor assembly of the present invention.

For example, turning to FIG. 6A, it may be advantageous to configure the rotor wall 22, the walls 42, or both such that the interaction time of microwave energy with anticipated interfacial surface 81, anticipated interfacial surface 83, or both, is promoted. In addition, or alternatively, it may be advantageous to promote interaction within the region 82 including a mixture and microwave energy. Therefore, perforated microwave reflector 101 may be positioned within rotor assembly 14. As shown in FIG. 6A, perforated microwave reflector 101 may be configured as a frustoconical body extending between interior shaft 36 and weir structure 30. Also, perforated microwave reflector 101 may be positioned generally along anticipated interfacial surface 81 or, alternatively, slightly radially outwardly therefrom. Such a configuration may reduce or limit microwave energy interaction with a separated constituent which may be included by region 80, while the perforations of perforated microwave reflector 101 may allow for the constituents of the mixture to pass freely radially within rotor assembly 14 and thus, may become separated centrifugally.

Perforated microwave reflector 101 may be configured with a plurality of perforations which are too small to allow microwave energy to pass therethrough. Explaining further, the wavelength of the microwave energy may substantially exceed the size of the perforations of perforated microwave reflector 101; therefore, the microwave energy may be reflected by perforated microwave reflector 101 rather than passing therethrough.

However, it may also be appreciated that position, shape, or both the position and shape of anticipated interfacial surface 81 or anticipated interfacial surface 83 may vary considerably depending on the actual constituents, constituent percentages of the mixture within region 82, and operating conditions of the rotor assembly 14. Put another way, anticipated interfacial surfaces 81 and 83 may be positioned within a range of positions within rotor assembly 14. Thus, it may be advantageous to position microwave reflector 101 at a position substantially corresponding to a position of nearest proximity that anticipated interfacial surface 81 and the rotor wall 22 may exhibit. Such a configuration may provide at least some reduction in interaction between microwave energy and a separated constituent within region 80. Of course, alternatively, if the anticipated interfacial surfaces 81 and 83 are, individually or in combination, predictable or stable, perforated reflector 101 may be positioned accordingly.

Figure 6B:
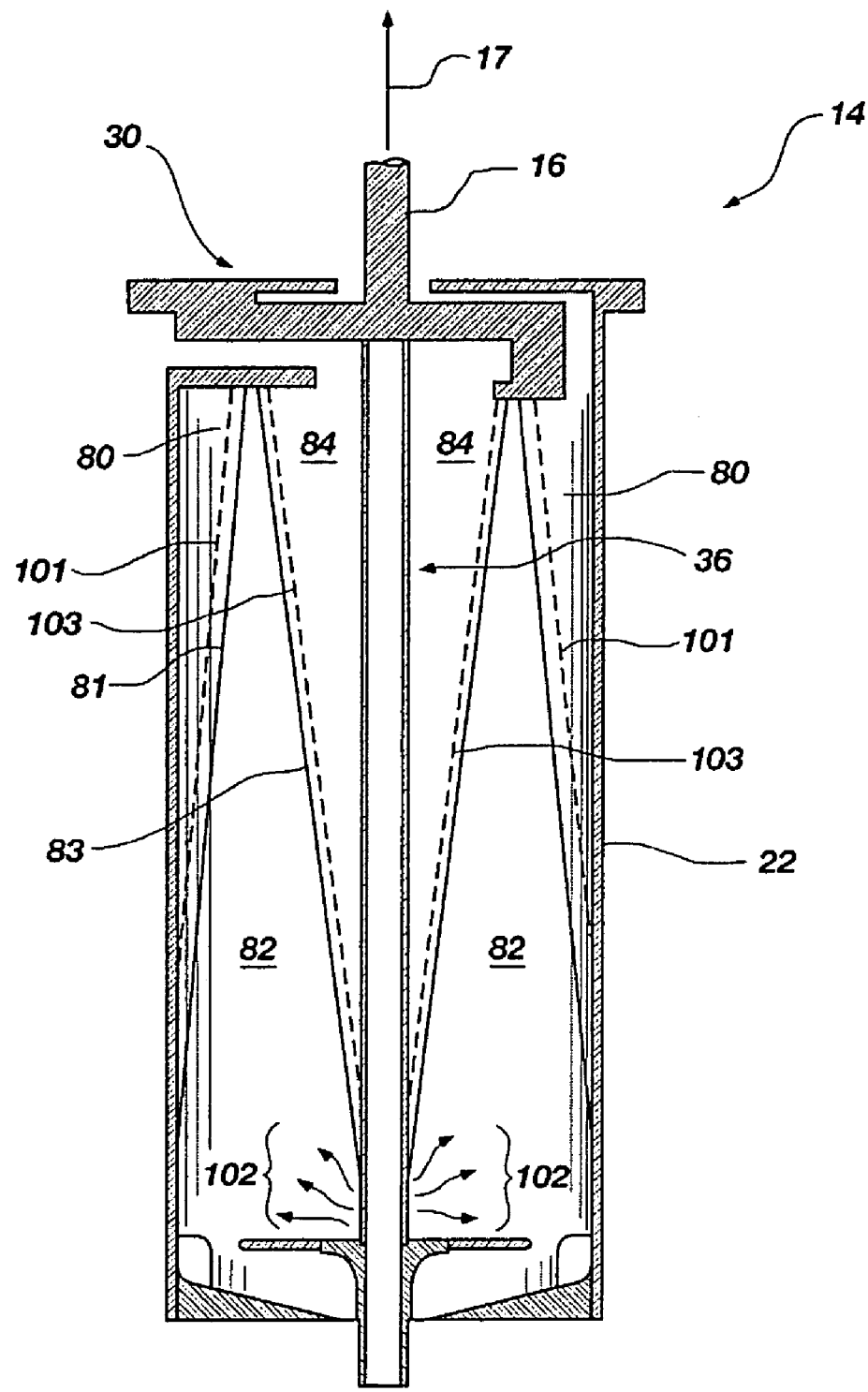
FIG. 6B shows a side cross-sectional view of another exemplary embodiment of a rotor assembly of the present invention.

In another embodiment, as shown in FIG. 6B, rotor assembly 14 may include perforated microwave reflectors 101 and 103. As shown in FIG. 6B, perforated microwave reflector 101 may be configured as a frustoconical body having a decreasing diameter in the direction of central axis 17 and extending between interior shaft 36 and weir structure 30. Also, perforated microwave reflector 101 may be positioned generally along anticipated interfacial surface 81 or, alternatively, slightly radially outwardly therefrom. Perforated microwave reflector 103 may be configured as a frustoconical body having an increasing diameter in the direction of central axis 17 and extending between rotor wall 22 and weir structure 30. Also, perforated microwave reflector 103 may be positioned generally along interfacial surface 83 or, alternatively, slightly radially inwardly therefrom.

As mentioned above, it may also be appreciated that position, shape, or both the position and shape of anticipated interfacial surface 81 or interfacial surface 83 may vary considerably depending on the actual constituents, constituent percentages of the mixture within region 82, and operating conditions of the rotor assembly 14. Thus, it may be advantageous to position microwave reflector 101 at a position substantially corresponding to a position of nearest proximity that anticipated interfacial surface 81 and the rotor wall 22 may exhibit. Such a configuration may provide at least some reduction in interaction between microwave energy and a separated constituent within region 80. Likewise, it may be advantageous to position microwave reflector 103 at a position substantially corresponding to a position of nearest proximity that anticipated interfacial surface 83 and the interior shaft 36 may exhibit. Such a configuration may provide at least some reduction in interaction between microwave energy and a separated constituent within region 84.

Also as shown in FIG. 6B, it may be preferable to introduce microwave energy from a selected longitudinal region 102 of interior shaft 36. In such a configuration, microwave energy may be substantially bounded by the presence of perforated microwave reflector 101, microwave reflector 103, walls 42 (not shown), and the rotor wall 22. Such a configuration may reduce or limit microwave energy interaction with a separated constituent which may be included by region 80 and may also facilitate separation of constituents of a mixture flowed through rotor assembly 14 during operation.

Summarizing, a rotor assembly of the present invention may include at least one perforated microwave reflector. It should also be understood from the above discussion that at least one perforated microwave reflector may be positioned within at least one of the chambers of a rotor assembly 14, as desired, for limiting the interaction with at least one separated constituent of a mixture passing therethrough, during operation.

While the present invention has been described herein with respect to certain preferred embodiments, those of ordinary skill in the art will recognize and appreciate that it is not so limited. Rather, many additions, deletions, and modifications to the preferred embodiments may be made without departing from the scope of the invention as hereinafter claimed. In addition, features from one embodiment may be combined with features of another embodiment while still being encompassed within the scope of the invention as contemplated by the inventors. Therefore, the invention is to encompass all modifications, equivalents, and alternatives falling within the spirit and scope of the invention as defined by the following appended claims.

What is claimed is:

1. An apparatus for centrifugally separating, at least in part, a mixture, comprising:
   a rotor assembly comprising:
      a circumferentially extending rotor wall defining, at least in part, at least one chamber; and
      a tubular interior shaft extending longitudinally within the rotor wall; and at least one microwave generation device positioned within the tubular interior shaft and configured for communicating microwave energy into the at least one chamber of the rotor assembly.

2. The apparatus of claim 1, further comprising armature windings positioned radially adjacent the rotor wall and configured for generating electricity in response to rotation of the rotor assembly through a magnetic field.

3. The apparatus of claim 2, wherein the armature windings are sized and configured for generating sufficient electricity for operating the at least one microwave generation device in response to rotation of the rotor assembly through the magnetic field at a rotational speed suitable for effecting at least partial centrifugal separation of the mixture.

4. The apparatus of claim 1, wherein the at least one microwave generation device is configured for communicating microwave energy into the at least one chamber from within the tubular interior shaft generally radially outwardly toward the rotor wall.

5. The apparatus of claim 1, further comprising at least one substantially vertical wall extending longitudinally within the rotor wall between at least a portion of the tubular interior shaft and the rotor wall and defining, at least in part, the at least one chamber.

6. The apparatus of claim 5, wherein the at least one substantially vertical wall extends generally radially between the tubular interior shaft and the rotor wall.

7. The apparatus of claim 5, wherein at least a portion of at least one of the rotor wall, the at least one substantially vertical wall, and the tubular interior shaft is substantially transparent to microwave energy.

8. The apparatus of claim 7, further comprising a reflector disposed a least partially about the at least one microwave generation device is positioned within the tubular interior shaft.

9. The apparatus of claim 8, wherein the at least one microwave generation device comprises a plurality of microwave generation devices.

10. The apparatus of claim 5, wherein the at least one substantially vertical wall and the rotor wall define, collectively, a plurality of chambers.

11. The apparatus of claim 10, wherein:
the plurality of chambers comprises four chambers;
the at least one microwave generation device comprises four microwave generation devices; and
each of the four microwave generation devices is configured for communicating microwave energy to a respective one chamber of the four chambers.

12. The apparatus of claim 5, further comprising:
a lower shaft extension of the tubular interior shaft extending longitudinally away from the rotor assembly; and
at least one microwave waveguide disposed within the lower shaft extension and the tubular interior shaft;
wherein the at least one microwave generation device is positioned proximate the lower shaft extension of the tubular interior shaft and is configured for communicating microwave energy into the at least one microwave waveguide.

13. The apparatus of claim 12, wherein:
the at least one substantially vertical wall and the rotor wall define, collectively, a plurality of chambers; and
the at least one microwave generation device and the at least one microwave waveguide are positioned and configured to communicate microwave energy within the plurality of chambers substantially sequentially.

14. The apparatus of claim 1, wherein the at least one microwave generation device comprises at least one of a maser, a klystron, and a magnetron tube.

15. The apparatus of claim 1, further comprising at least one microwave waveguide.

16. The apparatus of claim 1, wherein the at least one microwave generation device comprises at least one microwave generation device selected from the group consisting of a maser, klystron, and a magnetron tube.

17. The apparatus of claim 16, wherein at least a portion of the tubular interior shaft is substantially transparent to microwave energy.

18. The apparatus of claim 1, wherein the at least one microwave generation device is stationary with respect to rotation of the rotor assembly.

19. The apparatus of claim 1, further comprising a reflector disposed at least partially about the at least one microwave generation device and configured for directing microwave energy into the at least one chamber.

20. The apparatus of claim 1, further comprising at least one perforated microwave reflector disposed within the at least one chamber.

21. The apparatus of claim 20, wherein the at least one perforated microwave reflector comprises one perforated microwave reflector having a substantially frusto-conical shape.

22. The apparatus of claim 20, wherein the at least one perforated microwave reflector comprises at least two perforated microwave reflectors, each having a substantially frusto-conical shape.

23. The apparatus of claim 20, wherein the at least one perforated microwave reflector is positioned relative to a location of an anticipated interfacial surface between the mixture and a separated constituent thereof during operation of the apparatus.

24. The apparatus of claim 1, wherein at least a portion of one of the rotor wall and the tubular interior shaft is substantially transparent to microwave energy.

25. The apparatus of claim 1, further comprising:
a housing defining an interior volume;
wherein the rotor assembly is positioned within the interior volume of the housing; and
wherein the housing defines, at least in part, at least one inlet and at least one outlet each configured for conducting the mixture or a constituent thereof into or from the rotor assembly.

26. The apparatus of claim 25, further comprising armature windings positioned radially adjacent the rotor wall and configured for generating electricity in response to rotation of the rotor assembly through a magnetic field.

27. The apparatus of claim 26, wherein the armature windings are sized and configured for generating sufficient electricity for operating the at least one microwave generation device in response to rotation of the rotor assembly through the magnetic field at a rotational speed suitable for effecting centrifugal separation.

28. A method of operation of a centrifugal separator, comprising:
providing a centrifugal separator including a rotor assembly, the rotor assembly including:
a circumferentially extending rotor wall defining, at least in part, at least one chamber; and
a tubular interior shaft extending longitudinally within the rotor wall;

positioning at least one microwave generation device in the tubular interior shaft of the centrifugal separator;

introducing a mixture including at least two constituents within the at least one chamber of the rotor assembly;

rotating the rotor assembly; and communicating microwave energy into the at least one chamber of the rotor assembly while rotating the rotor assembly.

29. The method claim 28, wherein communicating microwave energy into the at least one chamber of the rotor assembly comprises communicating microwave energy through the tubular interior shaft.

30. The method of claim 28, wherein communicating microwave energy into the at least one chamber of the rotor assembly comprises communicating microwave energy through at least one microwave waveguide.

31. The method of claim 28, wherein communicating microwave energy into the at least one chamber of the rotor assembly comprises communicating microwave energy from a generally radially inward region thereof along a substantially radial direction outwardly therefrom.

32. The method of claim 28, further comprising:

separating at least a portion of one of the at least two constituents from the mixture; and communicating microwave energy generally toward an anticipated boundary surface defined between the mixture and the separated at least a portion of the one of the at least two constituents.

33. The method of claim 28, further comprising:

separating at least a portion of one of the at least two constituents from the mixture; and limiting interaction between the microwave energy and the separated at least a portion of the one of the at least two constituents.

34. A method of operation of a centrifugal separator, comprising:

providing a centrifugal separator including a rotor assembly, the rotor assembly comprising:

a circumferentially extending rotor wall;

a tubular interior shaft extending longitudinally within the rotor wall; and at least one chamber defined, at least in part, by the rotor wall;

flowing a mixture comprising at least two constituents through the rotor assembly while rotating the rotor assembly; and communicating microwave energy into the at least one chamber from a radially inward position within the rotor assembly generally toward a radially outward position therefrom.

35. The method of claim 34, further comprising:

separating at least a portion of one of the at least two constituents from the mixture; and communicating microwave energy generally toward an anticipated boundary surface defined between the mixture and the separated at least a portion of one of the at least two constituents.

36. A method of designing a centrifugal separator, comprising:

selecting a housing;

selecting a rotor assembly for assembly with and rotation within the housing, wherein the rotor assembly includes a tubular interior shaft;

selecting an anticipated mixture including at least two separable constituents for flowing through the rotor assembly; and positioning and configuring at least one microwave generation device in a tubular interior shaft of the rotor assembly for communicating microwave energy into the rotor assembly.

37. The method of claim 36, wherein positioning and configuring the at least one microwave generation device for communicating microwave energy into the rotor assembly comprises positioning and configuring at least one microwave generation device for communicating microwave energy into the rotor assembly generally from a radially central position therein generally toward a radially outward position.

38. The method of claim 36, further comprising selecting an anticipated boundary surface defined between the anticipated mixture and a separated at least a portion of one of the at least two constituents thereof during operation of the centrifugal separator.

39. The method of claim 38, wherein positioning and configuring the at least one microwave generation device for communicating microwave energy into the rotor assembly comprises positioning and configuring the at least one microwave generation device for communicating microwave energy generally toward the selected, anticipated boundary surface.

40. A method of operation of a centrifugal separator, comprising:

providing a centrifugal separator including a rotor assembly, the rotor assembly including at least one chamber configured for flowing a mixture therethrough;

flowing the mixture comprising at least two constituents through the at least one chamber of the rotor assembly while rotating the rotor assembly; and communicating microwave energy into the at least one chamber of the rotor assembly from a generally central radial position thereof to a position radially outward therefrom.

41. The method of claim 40, wherein communicating microwave energy into the at least one chamber of the rotor assembly comprises communicating microwave energy through a tubular interior shaft extending longitudinally therethrough.

42. A method of operation of a centrifugal separator, comprising:

providing a centrifugal separator including a rotor assembly, the rotor assembly including at least one chamber configured for flowing a mixture therethrough;

flowing the mixture comprising at least two constituents through the at least one chamber of the rotor assembly while rotating the rotor assembly;

separating at least a portion of at least one constituent of the at least two constituents from the mixture; and communicating microwave energy into the at least one chamber of the rotor assembly generally toward an anticipated boundary surface defined between the mixture and the separated at least a portion of one of the at least two constituents.

43. The method of claim 42, further comprising concentrating the microwave energy generally proximate a location of the anticipated boundary surface.

44. The method of claim 42, wherein the separated at least a portion of the at least one constituent has a greater density than the other of the at least two constituents of the mixture.

45. A method of operation of a centrifugal separator, comprising:

providing a centrifugal separator including a rotor assembly, the rotor assembly including at least one chamber configured for flowing a mixture therethrough;

flowing the mixture comprising at least two constituents through the at least one chamber of the rotor assembly while rotating the rotor assembly;

communicating microwave energy into the at least one chamber of the rotor assembly;

separating at least a portion of at least one constituent of the at least two constituents from the mixture; and limiting interaction of the microwave energy with the separated at least a portion of the at least one constituent.

* * * * *